United States Patent
Maynard et al.

(10) Patent No.: US 11,317,167 B2
(45) Date of Patent: Apr. 26, 2022

(54) CONTENT MANAGEMENT AND CONTROL BASED ON TRACKING OF PRIOR CONTENT PLAYBACK BEHAVIOR

(71) Applicant: Time Warner Cable Enterprises LLC, New York, NY (US)

(72) Inventors: Stephen L. Maynard, Thornton, CO (US); Nicholas Nielsen, Erie, CO (US); Ernie Biancarelli, Denver, CO (US); Thomas Gonder, Broomfield, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 479 days.

(21) Appl. No.: 15/152,967

(22) Filed: May 12, 2016

(65) Prior Publication Data

US 2017/0332120 A1 Nov. 16, 2017

(51) Int. Cl.
| | |
|---|---|
| *H04N 21/81* | (2011.01) |
| *H04N 21/25* | (2011.01) |
| *H04N 21/442* | (2011.01) |
| *H04N 21/454* | (2011.01) |
| *H04L 65/611* | (2022.01) |
| *H04N 21/488* | (2011.01) |

(52) U.S. Cl.
CPC ....... *H04N 21/812* (2013.01); *H04L 65/4076* (2013.01); *H04N 21/252* (2013.01); *H04N 21/44222* (2013.01); *H04N 21/454* (2013.01); *H04N 21/4882* (2013.01)

(58) Field of Classification Search
CPC . H04N 21/266; H04N 21/812; H04N 21/4383
See application file for complete search history.

(56) References Cited

U.S. PATENT DOCUMENTS

| 9,137,585 B2* | 9/2015 | Wong | H04N 21/26258 |
|---|---|---|---|
| 9,465,435 B1* | 10/2016 | Zhang | G06F 3/01 |
| 2004/0045020 A1* | 3/2004 | Witt | H04N 7/163 |
| | | | 725/13 |
| 2014/0325557 A1* | 10/2014 | Evans | H04N 21/4788 |
| | | | 725/34 |

* cited by examiner

*Primary Examiner* — Yassin Alata
(74) *Attorney, Agent, or Firm* — Armis IP Law, LLC

(57) ABSTRACT

According to one configuration, a content management resource receives feedback indicating playback commands applied to different portions of a given content stream (such as video content) played back by multiple viewers. The feedback can include video playback commands (such as fast forward commands, rewind commands, play commands, etc.) applied by the multiple users to the different portions of the given content stream. The content management resource aggregates the feedback to produce playback control information indicating playback commands applied by users of the multiple playback devices to the different portions of the given content stream. The content management resource uses the playback control information (aggregated feedback) to produce via timing information, locations of desirable segments and/or undesirable segments in the given stream as indicated by the previously applied commands. The content management resource inserts the aggregated feedback into the content metadata. Future user's playback devices are able to utilize the metadata to skip or otherwise control playback of (un)desirable sections of content.

23 Claims, 12 Drawing Sheets

TIMING INFO
135-1

CONTENT C1:

| TIME RANGE | SEGMENT TYPE |
|---|---|
| T1 TO T2 | D |
| T2 TO T3 | U |
| T3 TO T4 | D |
| T4 TO T5 | U |
| T5 TO T6 | D |
| T6 TO T7 | U |
| T7 TO T8 | D |

CONTENT MANAGEMENT AND CONTROL BASED ON TRACKING OF PRIOR CONTENT PLAYBACK BEHAVIOR

BACKGROUND

It is well-known that one or more conventional computer processing devices such as computers, set top boxes, televisions, etc., can be operated to play back content for viewing. For example, a user can provide input to a set top box to initiate playback of corresponding content on a television display screen. The content can be streamed from any suitable resource such as from a DVR, from a selected broadcast channel, on-demand channel, over-the-top channel, etc.

During playback operation, the user is typically able to apply different types of playback commands to control playback of the respective streaming content. For example, in certain instances, the user can apply rewind commands (including skip back commands) to change a current playback location of the content to an earlier playback time; the user can apply fast forward commands (such as a skip forward command or fast playback command) in order to quickly move a current playback location to a later point in time.

BRIEF DESCRIPTION OF EMBODIMENTS

The present disclosure includes the observation that most streaming content often includes undesirable portions (such as advertisements, boring content, objectionable content, offensive content, etc.) that consumers, as a community, tend to skip viewing via application of one or more respective commands during playback. Additionally, this disclosure includes the observation that streaming content may also include desirable portions that consumers tend to replay over and over again because the respective portion is, collectively, of significant interest or entertaining to the users.

Embodiments herein include identifying desirable and undesirable portions of content based on feedback from multiple users. For example, embodiments herein include utilizing prior playback commands applied to streaming content by each of multiple users to identify desirable and undesirable portions of video content. Consumers who have yet to watch a respective title of content may wish to be notified, via timing information (and/or content desirability information), which portion of the content the other viewers deemed as being desirable or undesirable for viewing. In certain instances, viewers may wish to control playback of the currently viewed content based at least in part on the prior playback control commands applied by the other viewers to such content.

In accordance with more specific embodiments, a content management resource receives feedback indicating playback commands applied to different portions of given content (such as video content) played back by each of multiple playback devices in a network environment. In one embodiment, the feedback includes video playback commands such as trick mode playback commands (such as fast forward commands, rewind commands, skip back commands, skip forward commands, play commands, etc.) applied by each of the multiple users to the different portions of the given streaming content.

The content management resource analyzes and/or aggregates the feedback to produce playback control information indicating playback commands applied by users of the multiple playback devices to the different portions of the given content. As previously discussed, the application of playback commands by users indicates whether corresponding content is desirable for viewing. In one embodiment, the playback control information (or corresponding derived information) is then used by the content management resource to determine a degree of desirability of the different portions of the given content amongst the users.

For example, in one embodiment, the playback control information derived from feedback indicates undesirable (objectionable) portions of the given streaming content as first portions of the given streaming content to which the users commonly and collectively applied fast forward playback commands (such as a skip forward command, jump ahead command, fast playback command, etc.). In one embodiment, application of fast-forward commands is assumed to indicate portions of the given streaming content in which the respective users were not interested in viewing playback of the content for any number of reasons, indicating that such a portion of the content was undesirable to view. In addition to application of commands, viewers of content also may be able to provide input indicating that they do not like corresponding portions of played back content to notify the content management resource of undesirable content.

Additionally, the content management resource can be configured to identify desirable portions of the given streaming content as second portions of the given content to which the users commonly applied rewind and play commands (such as a skip backward command, rewind playback command, etc.) to play back the same portion of respective content over again. Collective application of the rewind commands to the same portion of content amongst all of the users indicates portions of the given streaming content in which the respective users were interested in viewing playback of the content for any number of reasons. In addition to application of commands, viewers of content also may be able to provide input indicating that they like such portions of corresponding played back content to notify the content management resource of desirable content.

In accordance with further embodiments, the content management resource is operable to receive feedback (such as applied playback control commands) from any of one or more multiple playback devices playing back the given content. For example, in one embodiment, during operation, the content management resource receives first feedback from a first playback device playing back a first instance of the given streaming content. In this example, assume that the first feedback indicates that a user of the first playback device inputted a respective command to skip playback of a particular portion of the given streaming content. Additionally, the content management resource receives second feedback from a second playback device playing back a second instance of the given streaming content. The second feedback indicates that a user of the second playback device also inputted a respective command to skip playback of the particular portion of the given streaming content. Thus, feedback generated by the multiple users collectively indicates portions of undesirable content.

When aggregating the feedback to produce playback control information, the content management resource analyzes the received feedback and specific portions that were skipped or replayed multiple times by multiple users. In response to detecting that a quantity of users (such as above a threshold value or sufficient percentage of number) generated respective commands to skip playback of the particular portion of the given streaming content, the content management resource produces playback control information and/or timing information to indicate that the particular portion of the given streaming content was commonly skipped by a respective group of users.

In one embodiment, the content management resource marks or keeps track of the respective beginning location and end location of the particular portion of content that was found to be undesirable by the multiple users. Similarly, the content management resource can be configured to keep track of and mark locations of desirable portions of the given content replayed over and over again by respective users.

Thus, embodiments herein include a content management resource that produces timing information indicating locations of desirable and undesirable portions of the given content.

Subsequent to receiving the feedback and producing the playback control information/timing information, the content management resource (or other suitable resource) distributes the timing information to affect subsequent playback by one or more users.

As further discussed below, the timing information indicating locations of the desirable and undesirable portions of content can be used as a basis to control playback of the given content.

More specifically, the playback control information and/or timing information can be used for any suitable purpose. In one embodiment, a user of a respective playback device operated to playback the given streaming content may receive the timing information. The timing information can be used to notify the user of the respective playback device of commonly skipped portions of the given streaming content by the users of the multiple playback devices. If desired, the user viewing the given streaming content (to which the playback control information pertains) can rely on application of the playback control information to skip portions of the given streaming content that were found to be undesirable by the other users.

In yet further embodiments, the playback control information can be used to produce one or more different types of progress playback guides for display to a user of a respective playback device playing back a copy of the given streaming content.

As a more specific example, a progress playback guide can be generated to represent a full-length timeline and the different portions of the given streaming content. The progress playback guide (such as a progress playback bar or other suitable graphical user interface) can include one or more visual indicators to indicate a current playback location of the given streaming content as well as which portions of the given streaming content were commonly skipped by the users as indicated by the playback control information.

In accordance with another embodiment, the progress playback guide can be generated and displayed to a user of a respective playback device playing back the given content. As mentioned, the progress playback guide can be configured to represent the different portions of the given content as well as indicate a current playback location of the given content. Each of the one or more sections of the progress playback guide (corresponding to the different past, present, and future portions of the given content playback) can indicate a respective desirability rating of the different portions as determined from the received feedback. The desirability ratings can range from highly desirable content sections to lowly desirable content sections. Certain sections of the content can be indicated as being moderately desirable for viewing.

Accordingly, each of the different available portions/sections of the content played back can be assigned a different rating depending upon the prior applied playback control commands.

In accordance with further embodiments, a media player or other suitable resource can be configured to monitor timing of playing back the given content on a display screen. The playback monitor can be configured to utilize the timing information to provide notification to a user viewing the display screen that a first portion of content currently played back or about to be playback on the display screen was determined to be undesirable or objectionable based on previously applied playback commands to the respective section of the given content by other viewers.

In response to receiving input from the user viewing the display screen to skip the first portion of content currently played back on the display screen, because the playback control information indicates that the current playback portion is undesirable, the playback monitor or media player initiates playback of a second portion (such as a next portion following the first portion) of the given content on the display screen. In other words, the playback monitor can be configured to skip ahead in the playback of video to the next desirable portion to a location in the given content following the detected undesirable portion. Thus, the current viewer can avoid watching playback of the undesirable portions.

In accordance with further embodiments, note that the given content played back on a display screen can include advertisements intermixed among a respective program such as a movie, newscast, sports game, etc. It is known that many viewers typically skip through playback of respective advertisements when viewing respective content. By further way of non-limiting example, the content management resource can be configured to utilize the playback control information and/or corresponding timing information to identify one or more portions (timeslots) of the given streaming content that are allocated for inserting advertisements. The content management resource produces timing information indicating a location of the advertisement timeslots in the given streaming content. If desired, as further discussed below, the timing information can be subsequently used to control an ability of a respective user to apply playback control commands to playback of the given content.

In accordance with second embodiments, in a manner as previously discussed, the content management resource produces playback control information from playback commands applied to different portions of a given title of content played back by each of multiple playback devices. The content management resource uses the playback control information to produce timing information indicating a set of the different portions of the given title of content to which the playback commands were previously applied during playback by the multiple playback devices. The timing information is then used to control subsequent playback of the given title of content by another user.

As previously discussed, the playback commands can include fast forward commands applied by users of the multiple playback devices to skip playback of the different portions of content. The produced timing information indicates time slots, segments, sections, locations, etc., of the content (such as video content) in which the user's applied commands to skip playback of the different portions of content (i.e., portions identified as being undesirable).

In accordance with further embodiments, skipped portions of given content are assumed to be advertisements or commercials intermixed amongst program content. The duration and/or location of the skipped portions may provide a clue as to what type of content is being skipped. For example, a five minute segment commonly skipped by many viewers may indicate advertisements. If desired, use of the timing information to control subsequent playback of the given title of content can include: preventing a subsequent user playing back the given content from skipping playback of the different portions as specified by time slots of undesirable content. This embodiment prevents a subsequent user (playing back the giving content) from skipping through segments of content such as advertisements/commercials. Thus, during the subsequent playback of the given title of content, the timing information can be used to disable use of the playback control commands during the timeslots (undesirable content portions) as specified by the timing information.

Conversely, note that during playback of portions of the given content other than the advertisement/commercial timeslots, the timing information can indicate portions of the given content in which to enable use of the playback control commands. Thus, a user can be prevented from skipping advertisements, but may be able to control playback of non-advertisement information in the given content.

Additionally, in accordance with further embodiments, the timing information can be used to automatically skip playback of the identified undesirable portions of the given content when playing back the given content. In other words, a media player can be configured to use the timing information to identify commonly skipped portions of the given content. During playback, and on behalf of the viewer, the media player automatically (without further input from the user) skips over the commonly skipped portions of the given content by other viewers.

Alternatively, rather than automatically skip ahead or fast forward through the given content, the media player can provide notification to a respective viewer when currently watched portions of the given content were skipped by other users. The viewer may be required to provide input whether or not to skip such content. In such an instance, in response to receiving manual input from the viewer to skip the current portion after being notified that the currently watched portion of the given content is undesirable, the media player skips the portion and initiates playback of the next subsequent portion that was not skipped by other users.

Embodiments herein are useful over conventional techniques. For example, as previously discussed, embodiments herein provide a way of tracking portions of content that are of high to low interest to viewers as well as portions that fall anywhere in between. In accordance with further embodiments, if desired, the different portions of the given content can be assigned one of multiple different ratings between a high interest rating and a low interest rating. The tracking information indicating locations of desirable and undesirable portions of content can be used for any suitable reason.

These and other more specific embodiments are disclosed in more detail below.

Note that any of the resources as discussed herein can include one or more computerized devices, mobile playback devices, servers, base stations, wireless playback equipment, playback management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or other a medium such as firmware in one or more ROM, RAM, PROM, etc., and/or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage media and/or a system having instructions stored thereon to facilitate expanded use of one or more unique network identifier values over conventional techniques. For example, in one embodiment, the instructions, when executed by computer processor hardware, cause the computer processor hardware (such as one or more processor devices) to: receive feedback indicating playback commands applied to different portions of a given title of content played back by each of multiple playback devices in a network environment; produce playback control information from the received feedback, the playback control information indicating playback commands applied by users of the multiple playback devices to the different portions of the given title of content; and utilize the playback control information to determine a degree of desirability of the different portions of the given title of content amongst the users.

Yet another embodiment herein includes computer readable storage media and/or a system having instructions stored thereon to provide expanded use of one or more unique network identifier values over conventional techniques. For example, the instructions, when executed by a respective computer device (computer processor hardware), cause a processor or multiple processors (computer processor hardware) to: produce playback control information from playback commands applied to different portions of a given title of content played back by each of multiple playback devices; utilize the playback control information to produce timing information indicating a set of the different portions of the given title of content to which the playback commands were applied during playback by the multiple playback devices; and utilize the timing information to control subsequent playback of the given title of content.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of content playback and specifically identification of desirable and undesirable portions of content. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3 is an example diagram illustrating generation of timing information indicating a listing segments of desirable and undesirable content associated with corresponding content according to embodiments herein.

Figure 1:
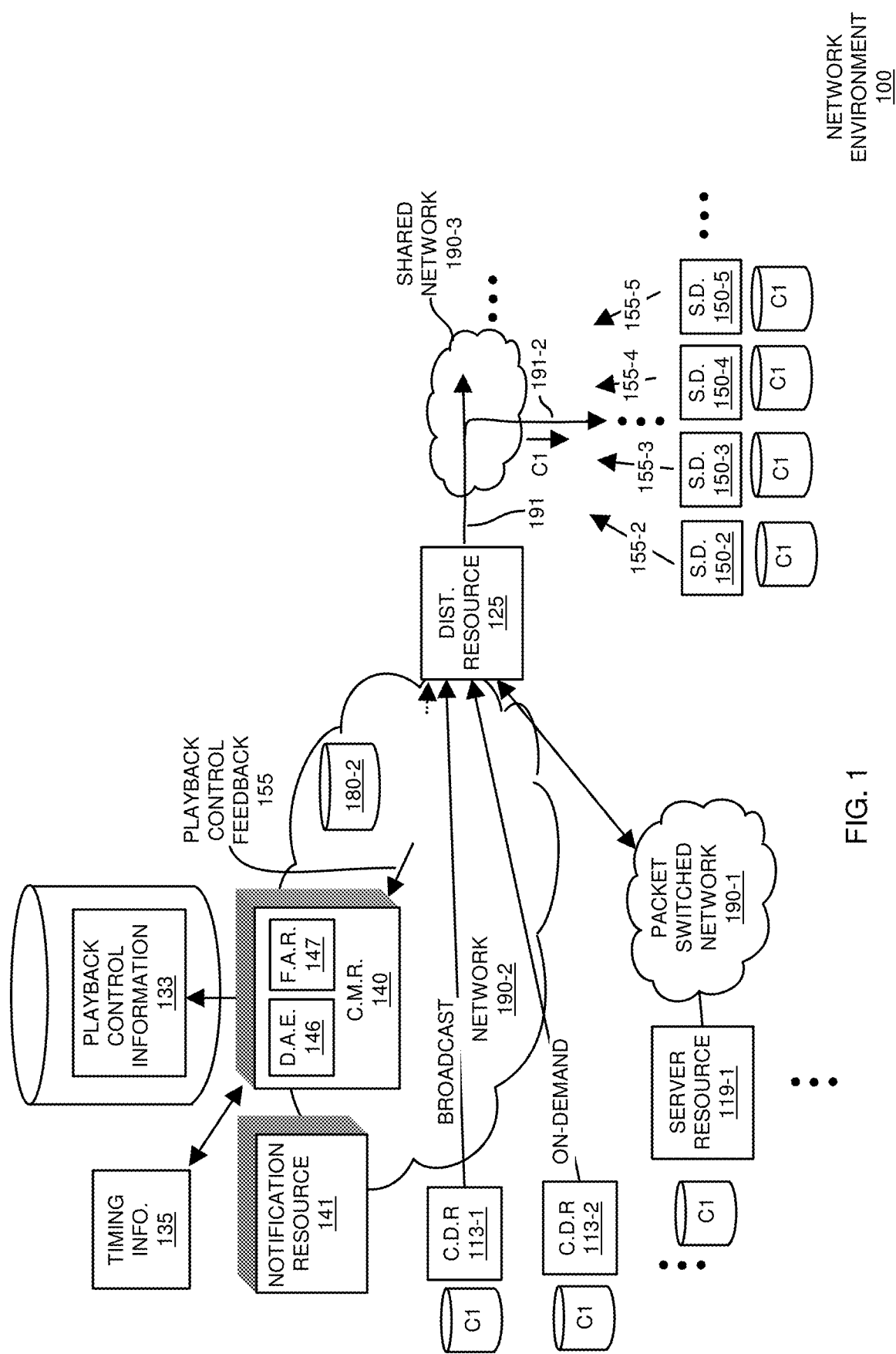
FIG. 1 is an example diagram illustrating aggregation of feedback (applied playback commands) from multiple playback devices and generation of respective playback control information and timing information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, FIG. 1 is an example diagram illustrating a network environment according to embodiments herein.

As shown, network environment 100 (such as a content delivery network) includes multiple networks 190 including networks such as a packet-switched network 190-1, a core network 190-2, shared network 190-3, etc. As further discussed below, each of the networks 190 supports distribution of content to one or more recipients.

Network environment 100 can include one or more repositories to store data. For example, network 190-2 can include a repository 180-2 (such as a remote digital video recorder or other suitable resource) accessible to one or more subscribers in respective subscriber domains 150. Content delivery resource 113-1 includes a respective repository from which to stream corresponding content C1 over network 190-2; content delivery resource 113-2 includes a respective repository which to stream corresponding content C1 over network 190-2; server resource 119-1 includes a respective repository to store corresponding content such as content C1 for delivery over packet-switched network 190-1.

Note that each of the repositories can store any number of titles of content for distribution to playback devices.

Accordingly, via the different types of networks 190, respective subscribers and corresponding playback devices 110 in subscriber domains 150 (or playback devices operated outside of subscriber domains 150) are able to retrieve and playback different types of content such as over-the-top content, scheduled broadcast content, video on-demand content, DVR-stored content, etc.

Network environment 100 further includes content management resource 140. In one embodiment, the content management resource 140 includes feedback aggregator resource 147 and data analyzer engine 146.

As its name suggests, the feedback aggregator resource 147 aggregates feedback 155 received from multiple devices playing back respective content C1.

In this example, the feedback 155 received by the feedback aggregator resource 147 includes feedback 155-2 from a video playback device operated in subscriber domain 150-2 to play back respective content C1; the feedback 155 received by the feedback aggregator resource 147 further includes feedback 155-3 from a playback device operated in subscriber domain 150-3 to play back respective content C1; the feedback 155 received by the feedback aggregator resource 147 further includes feedback 155-4 from a playback device operated in subscriber domain 150-4 to play back respective content C1; the feedback 155 received by the feedback aggregator resource 147 further includes feedback 155-5 from a playback device operated in subscriber domain 150-5 to play back respective content C1; and so on.

As previously discussed, embodiments herein include identifying desirable and undesirable portions of content C1 based on feedback 155 received from multiple users operating playback devices inside or outside of respective subscriber domains 150-2, 150-3, 150-4, 150-5, etc.

More specifically, embodiments herein include utilizing prior playback commands applied to streaming content C1 by multiple users in playback devices to identify desirable and undesirable portions of video content. A user who has yet to watch content C1 may wish to be notified, via aggregated playback control information 133 and/or timing information 135, which portions of content C1 were found to be desirable or undesirable for viewing by other viewers. Specifically, in certain instances, as further described herein, subsequent viewers of content C1 may wish to control playback of the respective content C1 based at least in part on the prior playback control commands applied by the other viewers.

As shown in this example embodiment, the feedback aggregator resource 147 of content management resource 140 receives feedback 155 indicating playback commands applied to different portions of given streaming content C1 (such as video content) played back by each of multiple playback devices in network environment 100. In one embodiment, the feedback 155 includes commands such as trick mode playback commands (such as fast forward commands, rewind commands, play commands, etc.) applied by each of the multiple users in subscriber domains 150-2, 150-3, 150-4, 150-5, etc., to the different portions of the given streaming content C1.

Note that each of the users can play back the content C1 at the same or different times. In one embodiment, the feedback 155 includes timing information or marker information indicating relative times or locations with respect to the streaming content C1 when users apply playback commands. Thus, using the timing information or other suitable marker information received in the feedback 155, the content management resource 140 is able to identify relative locations within the content C1 where the commands were applied.

Figure 2:
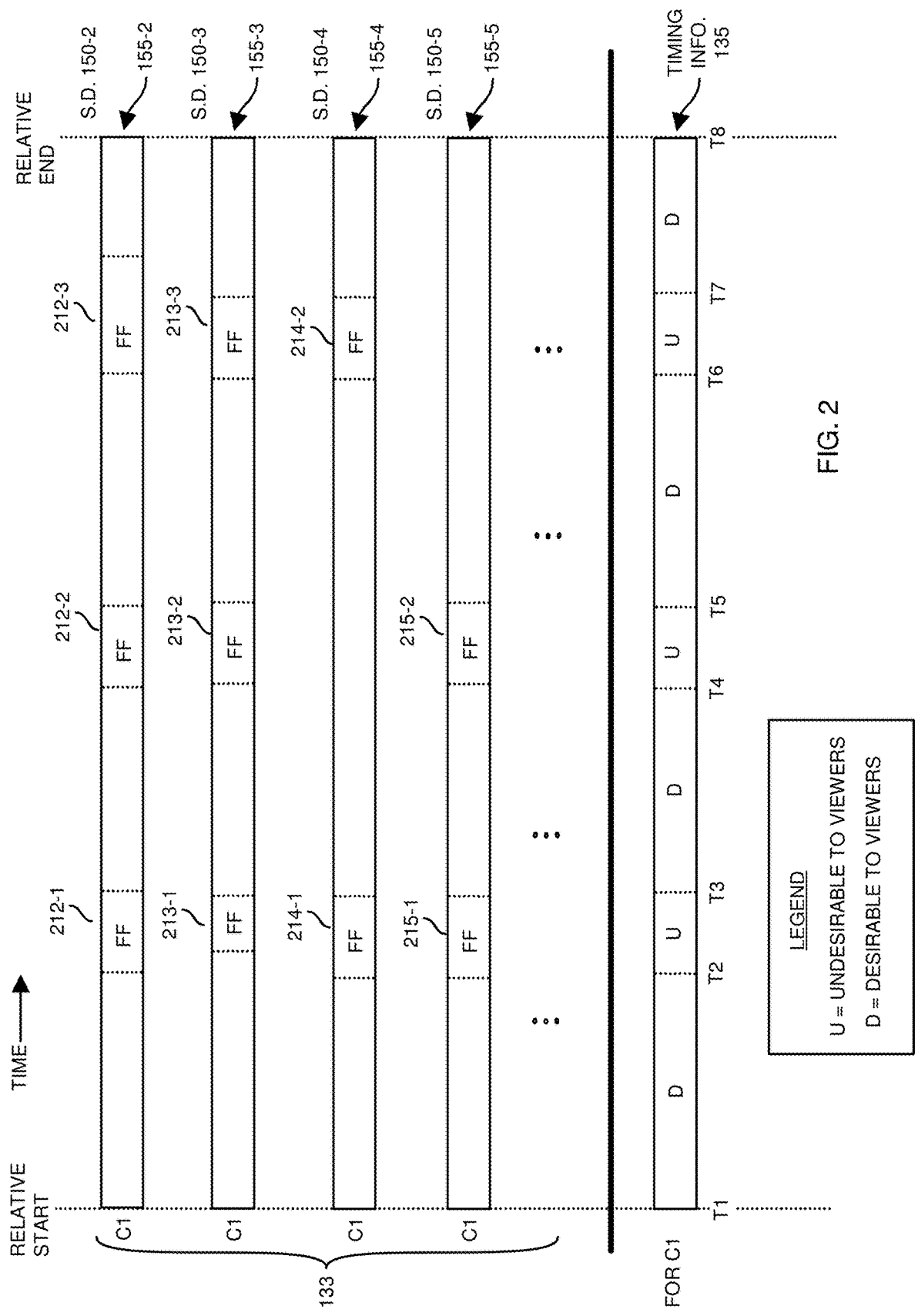
FIG. 2 is an example diagram illustrating derivation of timing information indicating desirable and undesirable portions of content from feedback according to embodiments herein.

FIG. 2 is an example diagram illustrating generation of timing information indicating desirable and/or undesirable portions of content from feedback according to embodiments herein.

Further in this example embodiment, as shown in FIG. 2, the feedback aggregator resource 147 aggregates the feedback 155 to produce playback control information 133. In one embodiment, the feedback aggregator resource 147 produces the playback control information 133 to indicate playback commands applied by users of the multiple playback devices (such as in the different subscriber domains) to the different portions of the given content C1. Note that the feedback from each of the multiple users can include any suitable information indicating which portions of the content C1 a respective user found to be undesirable or desirable.

As further discussed below, subsequent to aggregation and analysis of the feedback 155 received from the multiple viewers, the data analyzer engine 146 uses the playback control information 133 (aggregated feedback information) to determine a degree of desirability of the different portions of the given content amongst the users.

As further shown, the content management resource analyzes feedback from any of one or more playback devices playing back the given content C1. As shown, times in which the users apply fast forward commands to skip undesirable content varies.

More specifically, in this example, the content management resource 140 receives feedback 155-2 from a first playback device (in subscriber domain 150-2) playing back a first instance of the given streaming content C1. The feedback 155-2 indicates that a respective user of the first playback device inputted one or more fast forward commands to skip playback of portion 212-1 of the streaming content C1 around approximately between time T2 and T3; the feedback 155-2 further indicates that a respective user of the first playback device inputted one or more fast forward commands to skip playback of portion 212-2 of the streaming content C1 during playback around approximately between time T4 and T5; the feedback 155-2 further indicates that a respective user of the first playback device inputted one or more fast forward commands to skip playback of portion 212-3 of the streaming content C1 during playback around approximately between time T6 and T7.

Further in this example embodiment, the content management resource 140 receives feedback 155-3 from a second playback device (such as a playback device in subscriber domain 150-3) playing back a second instance of the given streaming content C1. The feedback 155-3 indicates that a respective user of the second playback device inputted one or more fast forward commands to skip playback of portion 213-1 of the streaming content C1 during playback around approximately between time T2 and T3; the feedback 155-3 further indicates that a respective user of the second playback device inputted one or more fast forward commands to skip playback of portion 213-2 of the streaming content C1 during playback around approximately between time T4 and T5; the feedback 155-3 further indicates that a respective user of the third playback device inputted one or more fast forward commands to skip playback of portion 213-3 of the streaming content C1 during playback around approximately between time T6 and T7.

Further in this example embodiment, the content management resource 140 receives feedback 155-4 from a third playback device (such as a playback device in subscriber domain 150-4) playing back a third instance of the given streaming content C1. The feedback 155-4 indicates that a respective user of the third playback device inputted one or more fast forward commands to skip playback of portion 214-1 of the streaming content C1 during playback around approximately between time T2 and T3; the feedback 155-4 further indicates that a respective user of the third playback device inputted one or more fast forward commands to skip playback of portion 214-2 of the streaming content C1 during playback around approximately between time T6 and T7.

Further in this example embodiment, the content management resource 140 receives feedback 155-5 from a fourth playback device (such as a playback device in subscriber domain 150-5) playing back a fourth instance of the given streaming content C1. The feedback 155-5 indicates that a respective user of the fourth playback device inputted one or more forward commands to skip playback of portion 215-1 of the streaming content C1 during playback around approximately between time T2 and T3; the feedback 155-5 further indicates that a respective user of the fourth playback device inputted one or more fast forward commands to skip playback of portion 215-2 of the streaming content C1 during playback around approximately between time T4 and T5.

In this manner, the content management resource 140 receives feedback 155 from any number (such as tens, hundreds, thousands, tens of thousands, hundreds of thousands, etc.) of playback devices.

In one embodiment, when aggregating the feedback 155 to produce playback control information 133 and deriving the timing information 135, the content management resource 140 (via data analyzer engine 146) analyzes the received feedback 155 and specific portions of streaming content C1 that were skipped via application of fast forward commands.

Because there was no significant amount of fast-forwarding applied by users viewing content C1 between time T1 and time T2, the content management resource 140 generates the timing information 135 to indicate that the portion of content between time T1 and time T2 is desirable.

Further, in one embodiment, in response to detecting that a threshold number of users above a threshold value or a threshold percentage of users generated respective commands to skip playback of a particular portion of the given streaming content C1, the content management resource 140 produces the timing information 135 to indicate that the particular portion of the given streaming content C1 (such as between time T2 and time T3) was a commonly skipped portion of the given streaming content C1 by the users. In other words, the content management resource 140 marks the range of content between time T2 and time T3 as being undesirable because a sufficient number of or percentage of viewers applied fast forward commands between time T2 and T3.

Because there was no significant amount of fast-forwarding applied by users viewing content C1 between time T3 and T4, the content management resource 140 generates the timing information 135 to indicate that the portion of content between time T3 and time T4 is desirable.

Further, in one embodiment, in response to detecting that a threshold number of users or a threshold percentage of users above a threshold value generated respective commands to skip playback of a particular portion of the given streaming content C1, the content management resource 140 produces the timing information 135 to indicate that the particular portion of the given streaming content C1 (such as between time T4 and time T5) was a commonly skipped portion of the given streaming content C1 by the threshold number of users. In other words, the content management resource 140 marks the range of content between time T4 and time T5 as being undesirable because a sufficient number of or sufficient percentage of viewers applied fast forward commands between time T4 and T5.

Because there was no significant amount of fast-forwarding applied by users viewing content C1 between time T5 and T6, the content management resource 140 generates the timing information 135 to indicate that the portion of content between time T5 and time T6 is desirable.

Further, in one embodiment, in response to detecting that a threshold number of users above a threshold value generated respective commands to skip playback of a particular portion of the given streaming content C1, the content management resource 140 produces the timing information 135 to indicate that the particular portion of the given streaming content C1 (such as between time T6 and time T7 was a commonly skipped portion of the given streaming content C1 by the threshold number of users. In other words, the content management resource 140 marks the range of content between time T6 and time T7 as being undesirable because a sufficient number of or sufficient percentage of viewers applied fast forward commands between time T6 and T7.

Because there was no significant amount of fast-forwarding applied by users viewing content C1 between time T7 and T8, the content management resource 140 generates the timing information 135 to indicate that the portion of content between time T7 and time T8 is desirable In this manner, via generation of the timing information 135, the content management resource 140 (data analyzer engine 146) marks or keeps track of the respective beginning location and end location of the particular portions of content that were found to be undesirable by the multiple users. In other words, the data analyzer engine 146 produces the timing information 135 for content C1 to indicate that the portion of content C1 between time T2 and T3, the portion of content C1 between time T4 and T5, the portion of content C1 between time T6 and T7 are undesirable for viewing by viewers.

Note that portions of the streaming content C1 that were not skipped by viewers may be presumed to be desirable portions for viewing. Accordingly, via generation of timing information 135, the content management resource 140 keeps track of and mark locations of desirable portions (such as between time T1 and T2, between time T3 and T4, between time T5 and T6, and between time T7 and T8) of the given content C1.

FIG. 3 is an example diagram illustrating generation of timing information indicating a listing segments of desirable and undesirable content associated with corresponding content according to embodiments herein.

Note that the timing information 135 can be generated and stored in any suitable manner.

For example, as shown in FIG. 3, the timing information 135 can indicate a respective playback time range and corresponding classification information indicating whether the segment of content in the playback time range is desirable or undesirable.

In this example embodiment, the timing information 135-1 indicates a respective range of time and corresponding classification indicating whether the segment of content in the range of time is deemed to be desirable or undesirable.

Note that in accordance with further embodiments, rather than being binary (i.e., labeling a respective segment of content as either desirable or undesirable), each of the different portions of content can be assigned a more precise classification than merely desirable or undesirable.

For example, the data analyzer engine 146 can be configured to assign an integer value between 1 and 10 to each of the different portions of content. Assignment of the value of 1 to a respective portion of content indicates that the respective portion of content is most desirable by viewers. Conversely, assignment of the value of 10 to respective portion of content indicates that that respective portion of content is least desirable by viewers. Thus, the assignment of the integer value 1 indicates most desirable content whereas assignment of the integer value 10 indicates the least desirable portion.

Portions of content assigned the value of 2 are less desirable for viewing than portions of content assigned the value of 1; portions of content assigned the value of 3 are less desirable for viewing than portions of content assigned the value of 2; portions of content assigned the value of 4 are less desirable for viewing then portions of content assign the value of 3; and so on up to 10.

The greater number of viewers that fast forward for skip through a respective portion of playing back the content C1, the higher the integer number that is assigned to the respective portion of C1. Accordingly, if a large number of viewers skip a corresponding portion of the content C1, that corresponding portion of the content is assigned a high-value such as 10 to indicate that it is least desirable.

In accordance with further embodiments, note that the playback control information 133 generated by the feedback aggregator resource 147 can include information indicating portions of the playback content C1 in which the users commonly applied one or more rewind playback commands to repeatedly view the same content. The data analyzer engine 146 can be configured to deem such portions as highly desirable content for viewing amongst the viewers. In such an instance, the common portions of the content C1 that are identified as being repeatedly played back by the large number of users above a threshold value are assigned a very low number such as a value of 1 or 2 to indicate that these portions of content are highly desirable for viewing.

Figure 4:
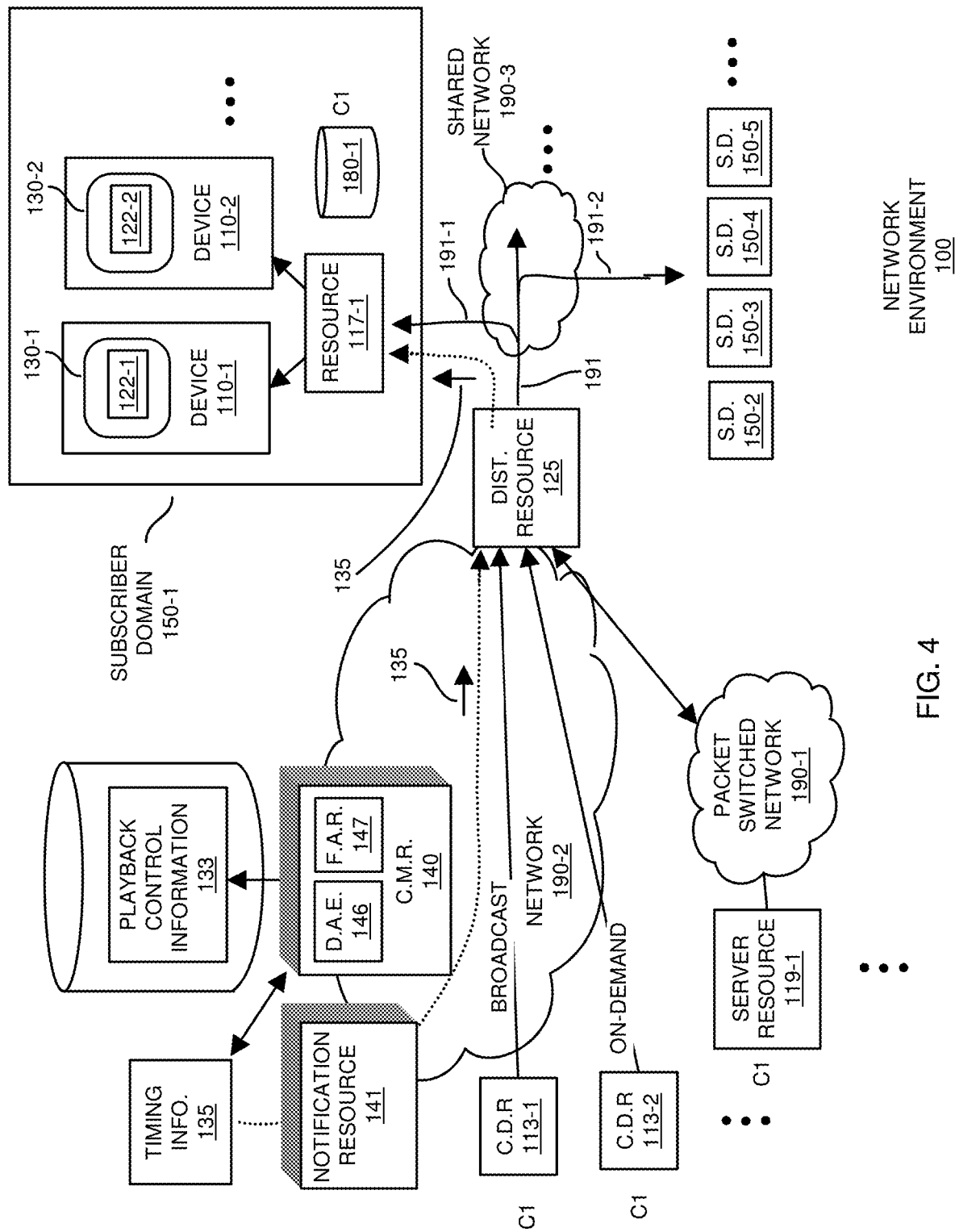
FIG. 4 is an example diagram illustrating distribution of timing information and/or playback control information indicating desirable and undesirable portions of content according to embodiments herein.

FIG. 4 is an example diagram illustrating distribution of timing information indicating desirable and undesirable portions of content according to embodiments herein.

As further shown in this example embodiment, network environment 100 includes subscriber domain 150-1. Subscriber domain 150-1 includes one or more playback devices such as content playback devices 110-1, 110-2, etc., operated by respective users to play back selected content such as content C1.

In this example embodiment, the playback device 110-1 includes display screen 130-1 and plays back a rendition of selected (requested) content C1; playback device 110-2 includes display screen 130-2 and plays back a rendition of selected content; and so on.

In addition to one or more playback devices 110 (collectively, device 110-1, device 110-2, etc.), subscriber domain 150-1 also includes resource 117-1 representing one or more resources such as one or more set-top boxes, cable modems, WiFi™ networks, server resources, data router, etc., in which to retrieve content C1 for playback.

As previously discussed, content C1 can be retrieved and played back in any suitable manner. For example, content C1 can be received over a broadcast channel from content distribution resource 113-1; content C1 can be received over an on-demand channel from content distribution resource 113-2; content C1 can be retrieved by a respective client device 110-1 from server resource 119-1; content C1 can be retrieved from a local repository 180-1; etc. Thus, the content C1 can be retrieved in any suitable manner.

As shown, shared network 190-3 can be configured to support final connectivity to subscribers or subscriber domains 150 and potentially includes physical media such as one or more coaxial cables, optical fibers, twisted wire pairs, etc., to provide connectivity. In one embodiment, each subscriber domain connected to the shared communication link 191 in shared network 190-3 is part of a respective service group that receives a same set of signals transmitted by distribution resource 125. Any of the devices in the service group can tune to the streaming content broadcasted over shared communication link 191. Other content transmitted over the shared communication link 191 may be specifically addressed to each of the playback devices.

As further shown in FIG. 4, subsequent to receiving the feedback 155, analyzing the playback control information 133, and producing the timing information 135, the notification resource 141 associated with content management resource 140 distributes the timing information 135 to affect subsequent playback of respective content C1 by one or more users.

As further discussed below, the timing information 135, which indicates desirable and undesirable portions of the streaming content C1, can be used for any suitable purpose.

For example, in one embodiment, a playback device playing back the streaming content C1 may retrieve the playback control information and/or timing information 135. The playback control information 133 and/or timing information 135 notifies a respective user of commonly skipped portions of the given streaming content C1 by the users of the other playback devices. If desired, the user viewing the given streaming content (to which the playback control information pertains) can rely on application of the playback control information, and previously applied commands by other users, to skip portions of the streaming content that were found to be undesirable by the other users.

Figure 5:
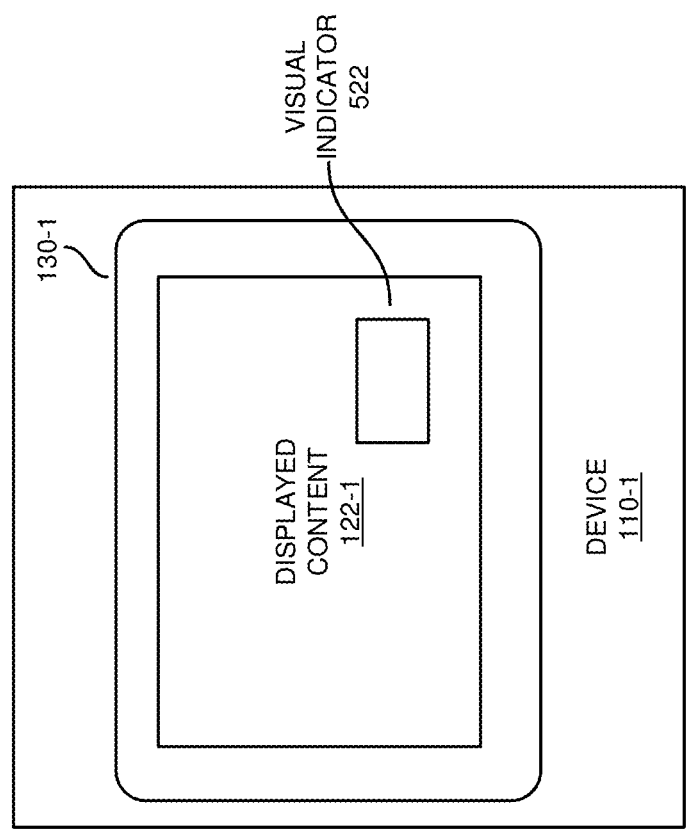
FIG. 5 is an example diagram illustrating playback of content and display of a respective visual indicator indicating whether one or more portions of content are deemed desirable or undesirable according to embodiments herein.

FIG. 5 is an example diagram illustrating playback of content and display of a respective visual indicator indicating whether one or more portions of content are deemed desirable or undesirable according to embodiments herein.

In this example embodiment, assume that a respective user 108 (viewer) operates device 110-1 to play back corresponding content C1. A rendition of the content C1 is displayed as displayed content 122-1 on display screen 130-1.

As previously discussed, the timing information 135 indicates the portions of the content C1 that are desirable and undesirable, or any grade in between. In one embodiment, a media player producing the displayed content 122-1 retrieves the timing information 135-1 from notification resource 141. In response to detecting that the portion of content currently displayed on the display screen 130-1 is identified as being undesirable as indicated by the timing information 135, the media player initiates display of visual indicator 522 to indicate that other users that previously viewed the content C1 identified the currently played back segment of content as being undesirable.

Accordingly, the media player initiating playback of the content C1 on the display screen 130-1 utilizes the control information 135 to provide notification to the respective viewer operating device 110-1 that the currently played back portion of content C1 is undesirable. If desired, the user operating the device 110-1 can provide input to fast-forward through the undesirable portion of content C1.

As a more specific example, the media player can be configured to display the visual indicator 522 in response to detecting that the current playback location of displaying respective content on the display screen 130-1 is between time range T2 and time T3. In response to receiving input from the respective user viewing the display screen 130-1, the media player skips ahead to playing back a respective segment of the content C1 at time T3. Thus, the timing information 135-1 enables the media player to easily skip past, without displaying, the undesirable portions of content C1 between time T2 and time T3. In a similar manner, each range of undesirable portions of content C1 can be skipped.

Figure 6:
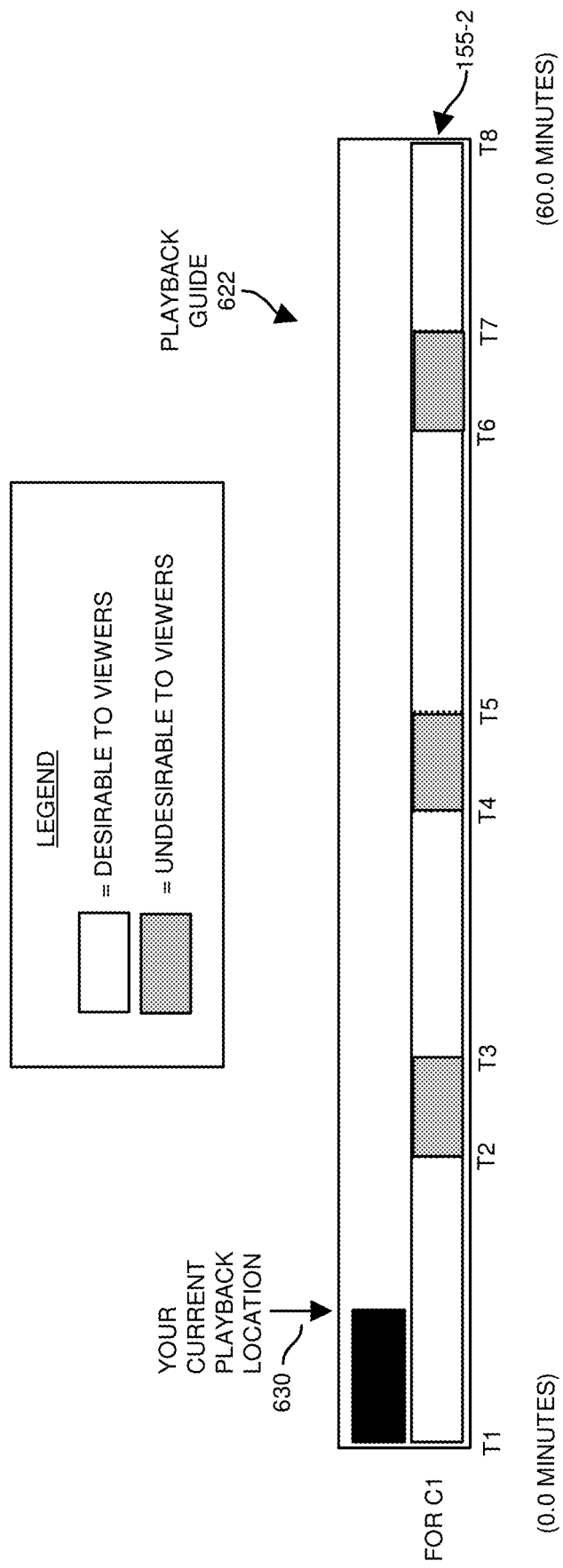
FIG. 6 is an example diagram illustrating display of a playback progress guide indicating locations of desirable and undesirable segments in streaming content according to embodiments herein.

FIG. 6 is an example diagram illustrating display of a playback progress guide indicating locations of desirable and undesirable segments in streaming content according to embodiments herein.

In one embodiment, the visual indicator 522 displayed on a respective display screen 130-1 is a progress playback guide 622 as shown in FIG. 6.

As shown, and as specified by the timing information 135, the progress playback guide 622 in this example represents a full-length timeline indicating the different portions of the given streaming content C1.

The progress playback guide 622 (such as a progress playback bar) can include one or more visual indicators such as pointer 630 to indicate a current playback location of the given streaming content on display screen 130-1. Additionally, the progress playback guide 622 can indicate which portions of the given streaming content were commonly skipped by the users as indicated by the playback control information 133.

In this instance, as indicated by the timing information 135, the progress playback guide 622 indicates that the segment of content between time T2 and time T3 was deemed by other viewers to be undesirable for viewing; the progress playback guide 622 indicates that the segment of content between time T4 and time T5 was deemed by other viewers to be undesirable for viewing; the progress playback guide 622 indicates that the segment of content between time T6 and time T7 was deemed by other viewers to be undesirable for viewing.

In this manner, the progress playback guide 622 can be generated to represent the different portions of the given content C1 as well as indicate a current playback location of the given content.

If desired, each of the one or more segments (sections) of the progress playback guide 622 (corresponding to the different portions of the given content playback) can be configured to indicate a respective desirability rating (such as desirable or undesirable, number from 1 to 10, color, etc.) of the different portions as determined from the feedback 155.

As previously discussed, rather than being binary ratings such as desirable or undesirable, the desirability ratings displayed in the progress playback guide 622 can range from highly desirable content sections (assigned a rating of one) to lowly desirable content sections (assigned a rating of 10), or anywhere between. Certain sections indicated as moderately desirable are assigned ratings of between 2 and 9. If desired, the progress playback guide 622 can be color-coded (such as from red, orange, yellow, green, blue, indigo, violet) or grayscaled to indicate the different levels of desirability assigned to the portions of content C1.

Accordingly, a respective user operating the playback device 110-1 can be notified of each of the different available portions of the content C1 played back for yet to be played back on the display screen 130-1 as well as desirability ratings derived from previously applied playback control commands (as indicated by feedback 155).

In accordance with further embodiments, note that a playback monitor (such as in a respective media player playing back the content C1) can be configured to monitor playback of the given content C1 on display screen 130-1. In a similar manner as previously discussed, the playback monitor can be configured to utilize the timing information 135 to provide notification to a user 108 viewing the display screen 130-1 that a first portion of content currently played back on the display screen 130-1 is determined to be undesirable or objectionable by other viewers as indicated by the generated timing information 135. In response to receiving input from the user 108 viewing the display screen 130-1 to skip the first portion of content C1 currently played back on the display screen 130-1, because the playback control information and/or timing information 135 indicates that the current playback portion is undesirable, the playback monitor initiates playback of a second portion (such as a next portion following the first portion) of the given content on the display screen 130-1. In other words, the playback monitor can be configured to skip ahead in the playback of video to the next desirable portion following the detected undesirable portion.

Figure 7:
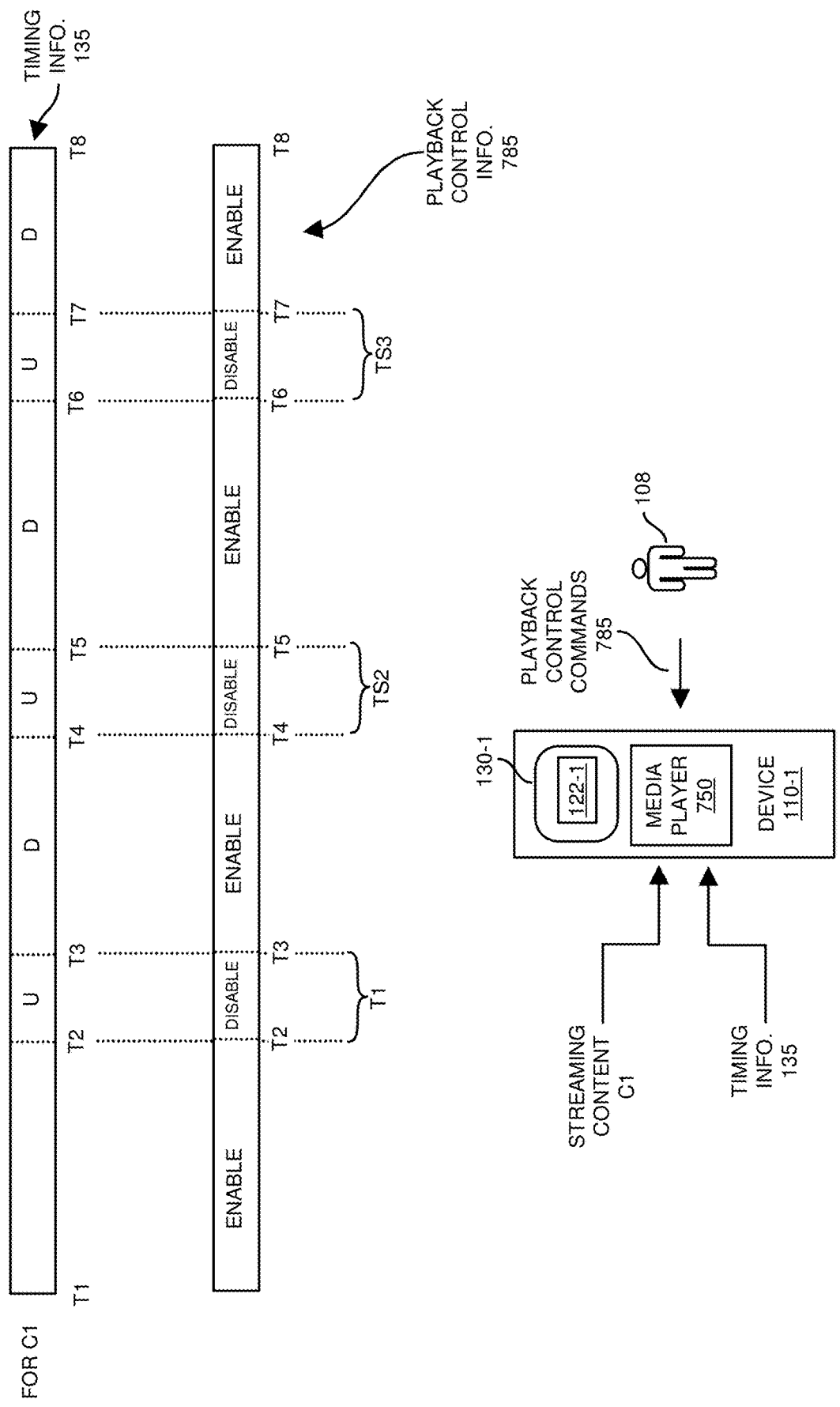
FIG. 7 is an example diagram illustrating use of respective timing information derived from previously applied playback control commands to control subsequent playback of content according to embodiments herein.

FIG. 7 is an example diagram illustrating use of respective timing information derived from previously applied playback control commands to control subsequent playback of content according to embodiments herein.

In accordance with further embodiments, the given content played back on a display screen can include advertisements intermixed among a respective program such as a movie, newscast, sports event, etc. It is known that many viewers typically skip through playback of respective advertisements when viewing respective content.

In one embodiment, the content management resource 140 utilizes the playback control information 133 derived from feedback 155 to identify one or more portions of the given streaming content allocated as advertisement timeslots. The content management resource 140 produces timing information 135 to indicate assumed locations of the advertisement timeslots (such as a first segment of content between time T2 and time T3, the second segment between time T4 and time T5, the third segment between time T6 and time T7, etc.) associated with the given streaming content C1.

The timing information can be subsequently used to automatically control playback of the streaming content C1 on the display screen 130-1. For example, the user 108 can configure the media player of device 110-1 to automatically skip the undesirable portions of content C1. In such an instance, when the media player detects playback of the corresponding segment starting at time T2, the media player automatically skips ahead to playback of streaming content at time T3. This alleviates the user 108 of device 110-1 from having to view the undesirable content residing between time T2 and time T3.

When the media player detects playback of the corresponding segment starting at time T4, the media player automatically skips ahead to playback of streaming content at time T5. This alleviates the user of device 110-1 from having to view the undesirable content residing between time T4 and time T5.

Thus, in accordance with embodiments herein, the timing information 135 can be distributed to automatically skip playback of the different portions of content in specified time slots to reduce a duration of time to playback the given title of content from start to finish. In other words, a media player can be configured to use the timing information to identify commonly skipped portions of the given content. During playback, on behalf of the viewer, the media player automatically skips over the commonly skipped portions of the given content by other viewers.

Alternatively, as previously discussed in FIG. 6, rather than automatically skip ahead or fast forward through the given content based on timing information 135, the media player (device 110-1) can provide notification (such as via visual indicator 522) to the respective user when currently watched portions (timeslot between T2 to T3, timeslot between T4 to T5, etc.) of the given content C1 were skipped by other users. As mentioned, the viewer may be required to provide input whether or not to skip such content. In such an instance, in response to receiving manual input (such as clicking a remote control button to skip ahead) from the viewer to skip the current portion after being notified that the currently watched portion of the given content is undesirable, the media player skips the portion and initiates playback of the next subsequent portion that was not skipped by other users.

As previously discussed, the content management resource 140 can be configured to assign different weight values or ranking information (such as based upon integer values between 1 and 10) to each of the portions of content C1. In one embodiment, a respective user inputs a time value indicating a desired duration of the playback for content C1. To play back all portions of content C1, it may require one hour of time. If the user inputs a time value of 0.5 hours, embodiments herein can include selecting the portions of content assigned the lowest integer values that fit within the 0.5 hour timeframe. Instead of playing back the whole hour of content, the media player playing back content C1 plays back 0.5 hours of the least skipped content by other viewers. In other words, the media player initiates playback of the portions of content C1 assigned the lowest integer value that fit within the 0.5 hour time request.

FIG. 7 is an example diagram illustrating use of respective timing information derived from previously applied playback control commands to control subsequent playback of content according to embodiments herein.

As previously discussed, the playback commands indicated by feedback 155 can include fast forward commands applied by users operating playback devices to skip playback of the different portions of streaming content C1. The produced timing information 135 indicates time slots in which the users applied commands to skip playback of the different portions in the set (i.e., portions identified as being undesirable).

In one embodiment, the portions of streaming content C1 marked to be skipped (as indicated by the timing information) because they are undesirable for viewing are assumed to be advertisements or commercials. Use of the timing information 135 to control subsequent playback of the given streaming content C1 can include: preventing a subsequent user playing back the given content C1 from skipping playback of the undesirable portions in timeslots TS1 (T2-T3), TS2 (T4-T5), TS3 (T6-T7), etc. Such an embodiment prevents a user 108 operating the device 110-1 from skipping through the assumed locations of advertisements/commercials intermixed amongst other content in streaming content C1. Thus, during the subsequent playback of the given title of content C1, the timing information 135 can be used to disable use of fast forward or skip playback control commands during the timeslots TS1, TS2, TS3, etc., as indicated by the timing information 135.

Conversely, note that during playback of portions of the given content C1 other than the assumed advertisement/commercial timeslots TS1, TS2, TS3, etc., the timing information 135 indicates portions of the given content C1 in which to enable use of the playback control commands by a respective user 108. Thus, a user 108 can be prevented from skipping assumed advertisements in timeslots TS1, TS2, TS3, etc., when viewing streaming content C1, but may control playback of non-advertisement information in the given content C1 outside of such timeslots such as between time T1 and time T2, between time T3 and time T4, between time T5 and time T6, etc.

Figure 8:
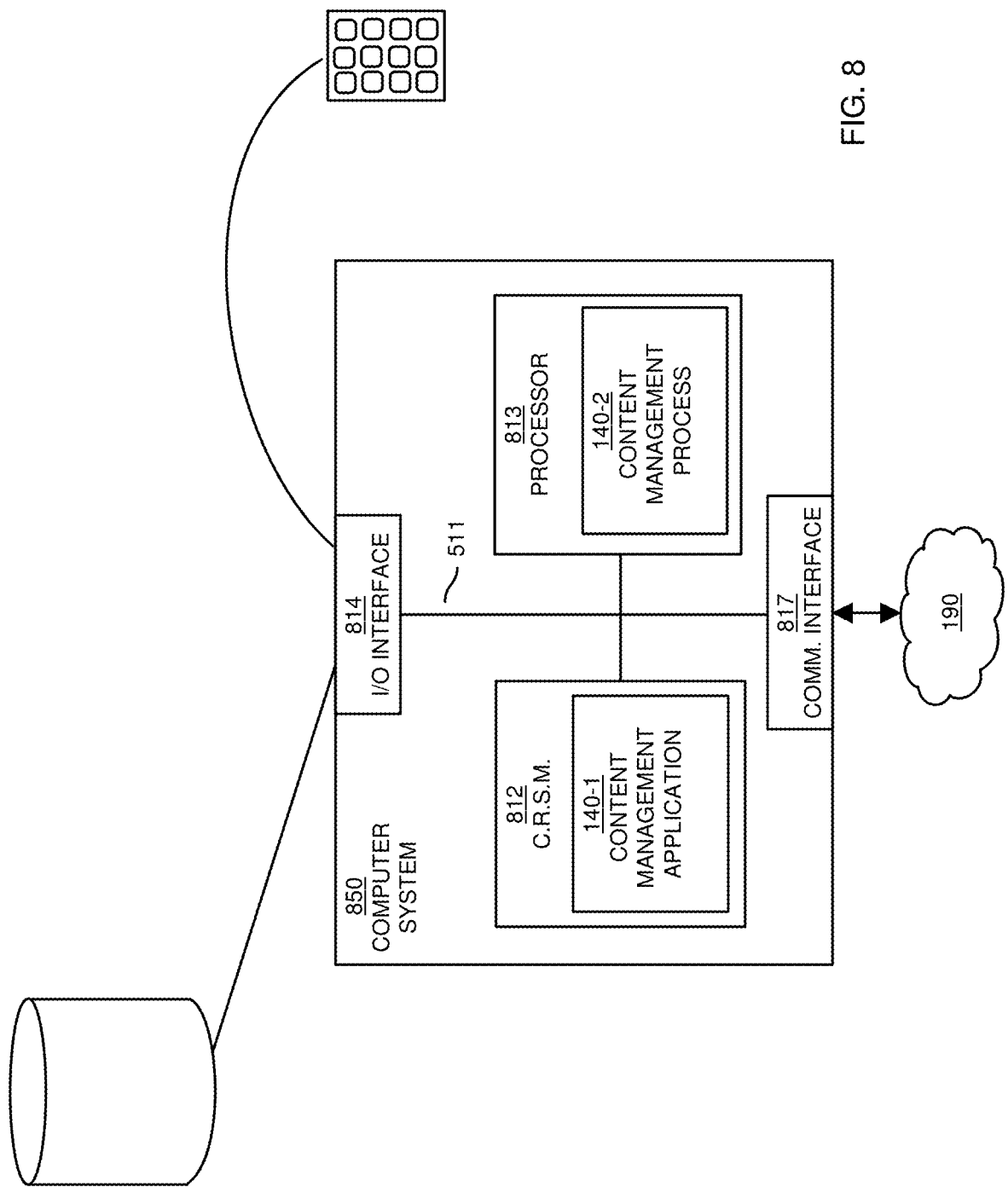
FIG. 8 is an example diagram illustrating a computer architecture in which to execute one or more embodiments as discussed herein.

FIG. 8 is an example block diagram of a computer system for implementing any of the operations as discussed herein according to embodiments herein.

Any of the resources (e.g., playback device, wireless access point, controller resource, management resource, call router, call handler station, etc.) can be configured to include a processor and executable instructions to carry out the different operations as discussed herein.

As shown, computer system 850 of the present example can include an interconnect 811 that couples computer readable storage media 812 such as a non-transitory type of media (i.e., any type of hardware storage medium) in which digital information can be stored and retrieved, a processor 813 (computer processor hardware), I/O interface 814, and a playbacks interface 818.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with content management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in content management application 140-1 stored on computer readable storage medium 812. Execution of the content management application 140-1 produces content management process 140-2 to carry out any of the operations and/or processes as discussed herein.

Those skilled in the art will understand that the computer system 850 can include other processes and/or software and hardware components, such as an operating system that controls allocation and use of hardware resources to content management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc.

The computer system 850 may reside at any location or can be included in any suitable resource in any network environment to implement functionality as discussed herein.

Functionality supported by the different resources will now be discussed via flowcharts in FIGS. 9-10. Note that the steps in the flowcharts below can be executed in any suitable order.

Figure 9:
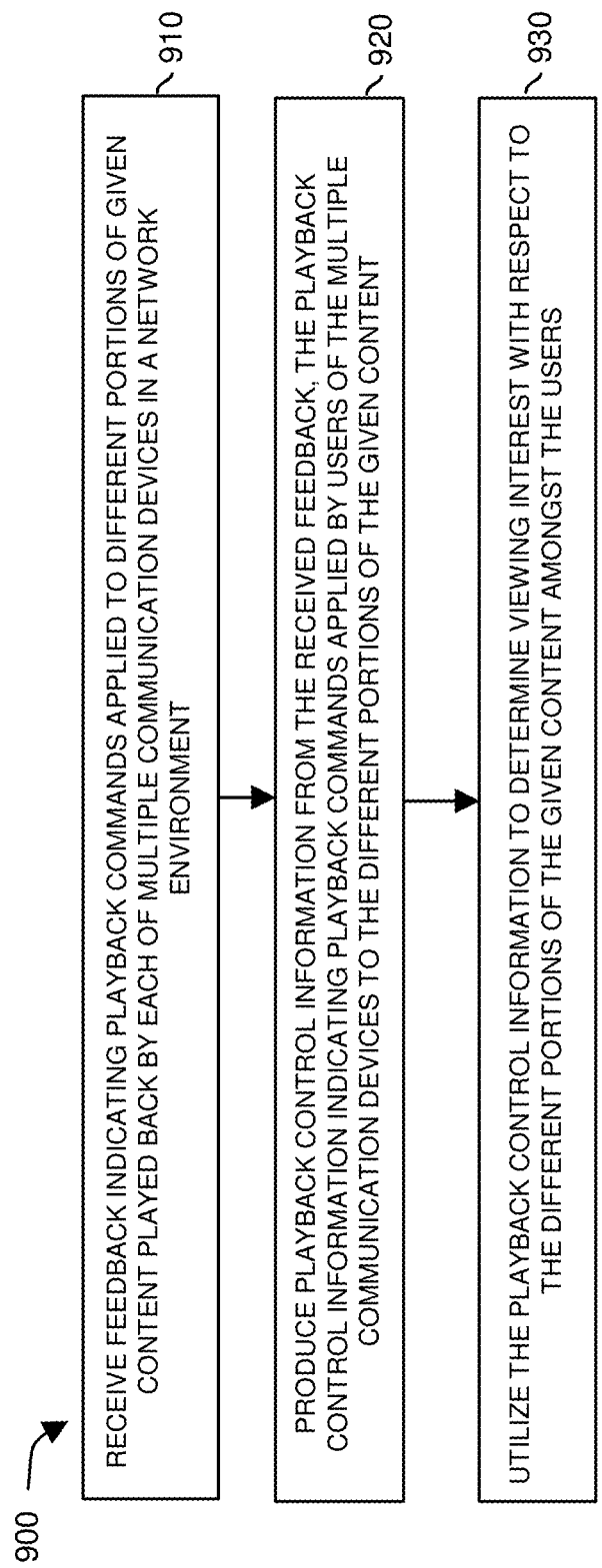
FIG. 9-10 are example diagrams illustrating various methods according to embodiments herein.

FIG. 9 is a flowchart 900 illustrating an example method according to embodiments. Note that there will be some overlap with respect to concepts as discussed above.

In processing operation 910, the content management resource 140 receives feedback 155 indicating playback commands applied to different portions of given content (such as content C1) played back by each of multiple playback devices in a network environment 100.

In processing operation 920, the content management resource 140 produces playback control information 133 from the received feedback 155. The playback control information 133 indicates playback commands (e.g., fast forward, rewind, etc.) applied by users of the multiple playback devices to the different portions of the given content.

In processing operation 930, the content management resource 140 utilizes the playback control information 133 to determine viewing interest with respect to the different portions of the given content amongst the users.

Figure 10:
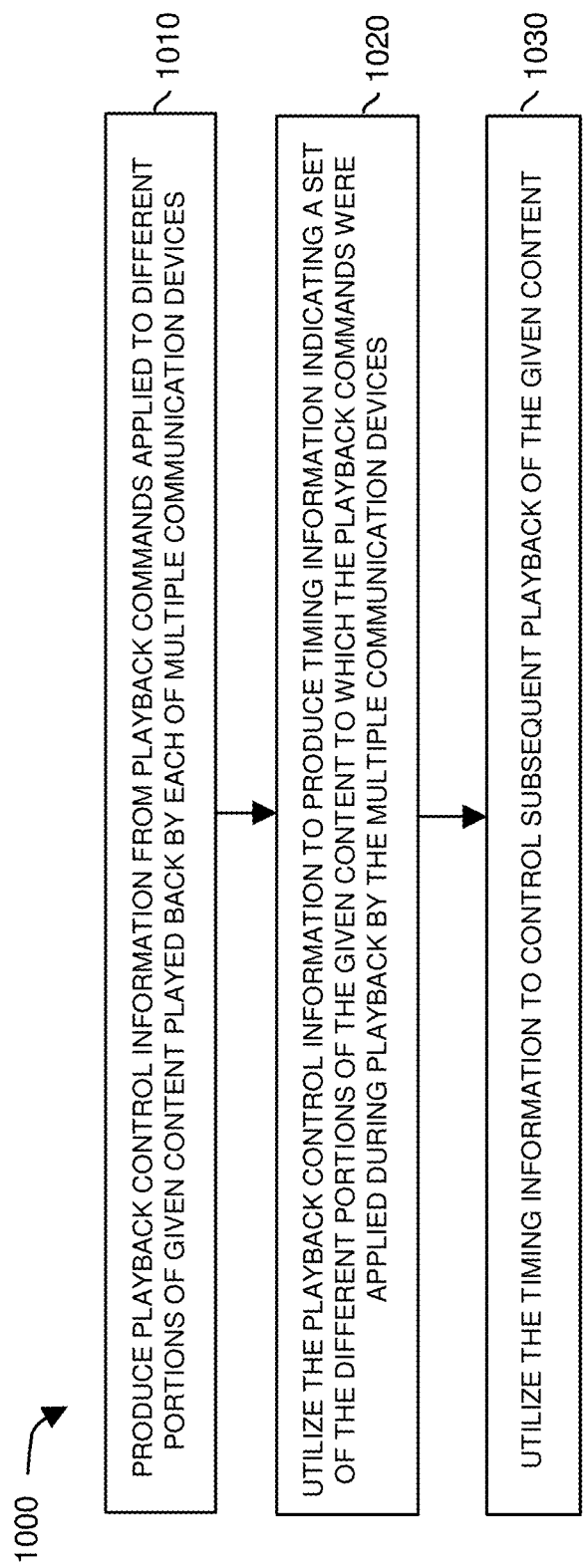

FIG. 10 is a flowchart 1000 illustrating an example method according to embodiments. Note that there will be some overlap with respect to concepts as discussed above.

In processing operation 1010, the content management resource 140 produces playback control information 133 from identified playback commands applied to different portions of given content played back by each of multiple playback devices.

In processing operation 1020, the content management resource 140 utilizes the playback control information 133 to produce timing information 135 indicating a set of the different portions of the given content to which the playback commands were applied during playback by the multiple playback devices.

In processing operation 1030, via notification resource 141, the content management resource 140 makes the timing information 135 available to other playback devices to control subsequent playback of the given content.

ADDITIONAL EXAMPLE EMBODIMENTS

As previously discussed, embodiments herein describe methods of skipping over sections of a content stream without the operator knowing or caring what the respective section of content contains.

In any given content delivery system, there may be millions of customers. Large cross-sections of customers within that content delivery system may watch the same content after having chosen to record or time-shift said content. When these customers perform certain recording or time-shifting events for a given content stream, the operator has the opportunity to collect said events for the purposes of enhancing their system.

In this specific case, the collected time-shifting user events can benefit other potential viewers by indicating to that user that others have chosen to fast-forward at a given point for a specific amount of time and then resume a normal play rate at a later time.

One can imagine that if some threshold number or percentage of customers greater than 50% chose to fast-forward at 8 minutes and 10 seconds into a given content stream and then that same percentage of customers chose to resume normal play rate 64 seconds later in that stream that there was a section of undesirable content that future customers may also wish to skip.

As previously discussed, the delivery system owner could chose to add this information to the proprietary metadata they attach to the given content and then when future customers decided to play that content they could be alerted with a banner or another audio/visual method that by performing a certain action (like pressing a button or providing a speech command) an undesirable section can be skipped automatically.

In an alternative embodiment, rather than skip sections of a stream, the operator could use the same information to identify when trick modes could be disabled or enabled. Consider on-demand content where trick modes are disabled by requirement. Often times content owners make this requirement to force viewers to watch advertising within the content. The effect of this requirement is typically not painful to the viewer until the stream must be restarted for some reason; e.g. the stream is lost ¾ the way through due to unforeseen circumstances and a bookmark was not made. Upon reloading the stream the viewer must watch the full stream at normal play rate to get back to the position they were viewing. If allowed, the viewer could fast forward through the content and then be forced to watch each ad segment at normal play time. This allows the viewer to get back to their spot a little faster than without trick-modes at all.

Today, trick-mode data is already being collected in content delivery systems. This data can be correlated into a database such that queries based on the content stream can yield information about sections of that stream that high percentages of customers have skipped. For each of these sections of the content a 'skip-point' time (SP) and duration (D) can be established. Based on that data, content metadata can be augmented such that when the local normalized playback for the content reaches a given SP+D the local user can be notified with an A/V cue. If they so choose, they can perform a single action that will advance the playback of the content stream to the end of the SP+D section. A given content stream may have multiple SP+D sections and they would be arranged in an array and be made available in the content metadata.

A Time-Shifted Specific Example

Assume that content Spiderman 3 is made available on a broadcast service in the New York division. Assume that its metadata does not contain any SP+D information. The length of Spiderman 3 is 120 minutes. In the first 2 hours of availability, 10000 customers have chosen to watch Spiderman 3. 3000 of those customers have time shifted by pressing pause for more than 30 seconds. Of those 3000 customers a pattern of 'fast-forward' followed by 'play' at certain points in the content becomes apparent. Since this pattern is observed in a threshold number such as more than 1500 of the 3000 customers, the SP+D search algorithm(s) are executed. The algorithms produce 9 SP+D values. These values are added to the metadata for Spiderman 3. Non-correlating trick-mode positions from all customers are ignored.

In the second 2 hours of availability 5000 more customers have chosen to watch Spiderman 3, and have time-shifted by pausing more than 30 seconds. This time the metadata contains SP+D values. When each of those customers streams reach a given SP+D in playback an A/V cue is presented. Some customers respond to the cue by pressing a button on the remote control and the section is skipped; others view the section. These control events can be recorded for future use.

A Recording Specific Example

As mentioned above, assume that Spiderman 3 was made available on a broadcast service in the New York division. Its metadata did not originally contain any SP+D information. In the first 2 hours of availability, 10000 customers have chosen to watch Spiderman 3 while 5000 customers chose to record and watch later. Of those 5000 customers, 4000 chose to watch their recordings more than 2 hours after the original airing. These 4000 customers get to take advantage of the updated metadata for the content and have the same viewing experience as the customers that watched above in the second 2 hour period. The other 1000 viewers that did not wait for the metadata update helped contribute to the SP+D data collection and metadata update.

Even though customers received metadata with SP+D information, a new pattern of 'fast-forward' followed by 'play' is detected in the first 2 minutes of playback. Since this pattern is observed in more than 2000 of the 4000 customers that received SP+D information the algorithm(s) are engaged once more and produce a new SP+D value that hadn't previously been detected. This value is added to the metadata for Spiderman 3. Again, non-correlating trickmode positions from all customers can be ignored.

As before, when each of these customers streams reach a given SP+D in playback an A/V cue is presented. Some customers respond to the cue and press a button to skip the section, while others view the section. These events are also recorded for future use.

Figure 11:
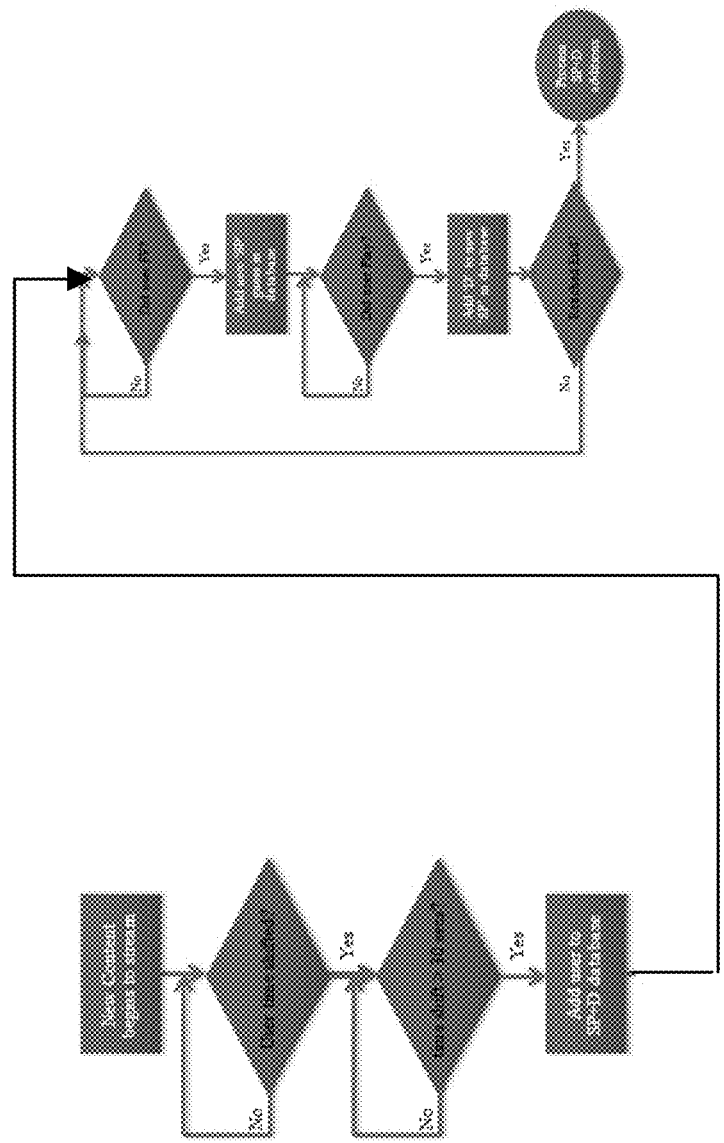
FIG. 11 is an example diagram illustrating a method of collecting feedback from multiple playback devices according to embodiments herein.

FIG. 11 is an example diagram illustrating a method of collecting feedback from multiple playback devices according to embodiments herein.

Figure 12:
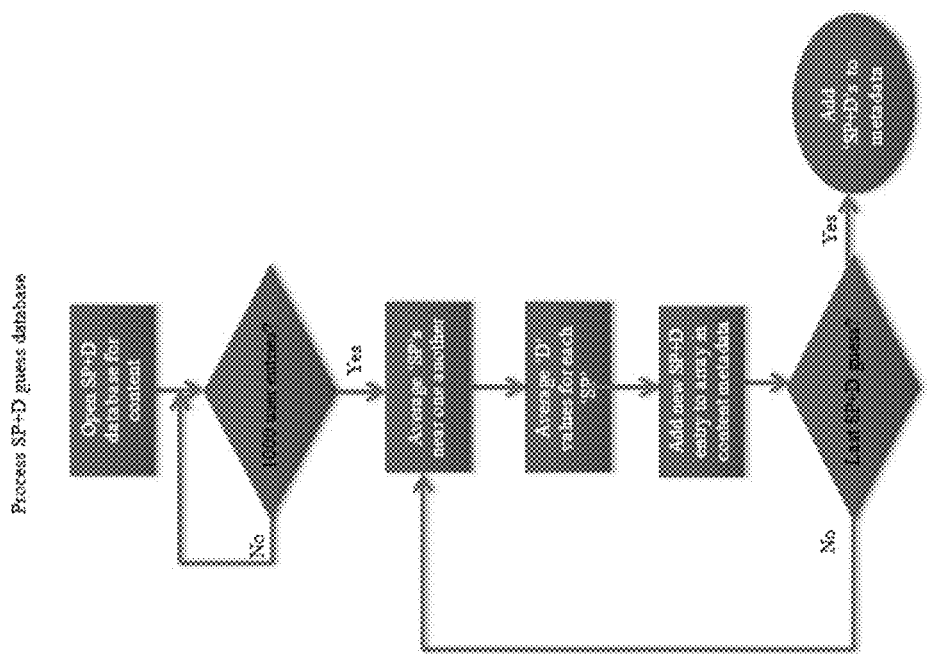
FIG. 12 is an example diagram illustrating a method of analyzing in processing collected feedback according to embodiments herein.

FIG. 12 is an example diagram illustrating a method of analyzing in processing collected feedback according to embodiments herein.

Note again that techniques herein are well suited to use collected playback control feedback to enhance subsequent playback of content by other users. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via computer processor hardware, performing operations of:
   receiving feedback indicating playback commands applied to different portions of given content played back by each of multiple playback devices operated by users in a network environment;
   utilizing the received feedback to determine viewing interest with respect to the different portions of the given content amongst the users;
   displaying a playback timeline on a display screen of a first playback device of the multiple playback devices, the playback timeline displayed for viewing by a user of the first playback device, the displayed playback timeline simultaneously indicating the different portions of the given content and a respective level of viewing interest for each of the different portions as indicated by the feedback;
   wherein each of the different portions of content are assigned one of multiple different viewing desirability ranking values based on the feedback, the method further comprising:
   receiving a playback time value indicating a desired duration of time in which to playback the given content, the playback time value being less than an amount of time needed to playback the given content in its entirety; and
   to provide payback of the given content in the desired duration of time as specified by the time value, selecting portions of the given content that are assigned a highest viewing desirability ranking value such that the selected portions of the given content, when played back to a viewer, fit within the playback time value.

2. The method as in claim 1, wherein receiving the feedback includes:
   receiving notification of playback commands applied by each of the users to the different portions of the given content.

3. The method as in claim 1, wherein utilizing the received feedback to identify viewing interest with respect to the different portions includes:
   identifying undesirable portions of the given content as first portions of the given content to which the users commonly applied fast forward playback commands.

4. The method as in claim 1, wherein utilizing the received feedback to identify viewing interest with respect to the different portions includes:
   identifying desirable portions of the given content as second portions of the given content to which the users commonly applied rewind playback commands.

5. The method as in claim 1, wherein the displayed playback timeline indicates which of the different portions of the given content is commonly skipped by the users of the multiple playback devices.

6. The method as in claim 1, wherein utilizing the received feedback further comprises:
   producing a progress playback guide for display to the user of a respective playback device playing back an instance of the given content, the progress playback guide representing the different portions of the given content, the progress playback guide indicating a current playback location of the given content and which portions of the given content were commonly skipped by the users as indicated by the received feedback.

7. The method as in claim 1, wherein utilizing the received feedback to determine viewing interest with respect to the different portions of the given content further comprises:
utilizing the received feedback to identify a portion of the given content allocated as an advertisement timeslot; and
producing timing information indicating a location of the advertisement timeslot in the given content.

8. The method as in claim 7 further comprising:
utilizing the timing information to control an ability of a respective user to apply playback control commands to the instance of playing back the given content.

9. The method as in claim 8, wherein utilizing the timing information to control the ability of the respective user to apply playback control commands further comprises:
disabling use of the playback control commands during the advertisement timeslot in the given content; and
enabling use of the playback control commands during non-advertisement timeslots in the given content.

10. The method as in claim 1, wherein the given content is video data.

11. The method as in claim 1 further comprising:
simultaneously displaying a visual progress indication alongside the playback timeline, the visual progress indication indicating a current playback time of the given content being played back by the first playback device.

12. The method as in claim 1 further comprising:
in the displayed playback timeline, displaying a first segment corresponding to a first portion of the given content; and
in the displayed playback timeline, displaying a second segment corresponding to a second portion of the given content.

13. The method as in claim 12, wherein the first segment spans a first time range in the playback timeline, the first time range defined by a corresponding first start time and a first stop time in the playback timeline; and
wherein the second segment spans a second time range in the playback timeline, the second time range defined by a corresponding second start time and a second stop time in the playback timeline.

14. The method as in claim 13, wherein the first portion is determined to be desirable for viewing as indicated by the received feedback; and
wherein the second portion is determined to be undesirable for viewing as indicated by the received feedback.

15. The method as in claim 1 further comprising:
producing a first visual indication in the displayed playback timeline to indicate a corresponding playback time range of a first segment of the given content; and
producing a second indication in the displayed playback timeline to indicate a corresponding playback time range of a second segment of the given content.

16. The method as in claim 15, wherein the first visual indication indicates that the first segment of the given content is undesirable for viewing as indicated by the received feedback; and
wherein the second visual indication indicates that the second segment of the given content is undesirable for viewing as indicated by the received feedback.

17. The method as in claim 15, wherein the first visual indication indicates that the first segment of the given content is desirable for viewing as indicated by the received feedback; and
wherein the second visual indication indicates that the second segment of the given content is desirable for viewing as indicated by the received feedback.

18. The method as in claim 1, wherein visual indications of time ranges on the displayed playback timeline indicate an overall relative magnitude of desirable portions of the given content versus a relative magnitude of undesirable portions of the given content as indicated by the feedback, a first portion of the time ranges indicating the desirable portions of the given content, a second portion of the time ranges indicating the undesirable portions of the given content.

19. The method as in claim 14 further comprising:
simultaneously displaying a visual progress indication on the playback timeline along with the first segment and the second segment, the visual progress indication indicating a current playback time with respect to the first time range and the second time range.

20. The method as in claim 19, wherein the current playback time falls within the first time range.

21. The method as in claim 19 further comprising:
displaying the visual progress indication as a distal end of a display bar displayed next to the playback timeline.

22. The method as in claim 1 further comprising:
displaying a visual progress indication as a point in time on the playback timeline, the visual progress indication indicating a current playback location of the given content played back on the display screen; and
displaying a start time and an end time on the timeline, the start time and stop time indicating a time range of desirable content as indicated by feedback, the visual progress indication residing in the time range.

23. A method comprising:
via computer processor hardware, performing operations of:
receiving feedback indicating playback commands applied to different portions of given content played back by each of multiple playback devices operated by users in a network environment;
utilizing the received feedback to determine viewing interest with respect to the different portions of the given content amongst the users; and
displaying a playback timeline on a display screen of a first playback device of the multiple playback devices, the playback timeline displayed for viewing by a user of the first playback device, the displayed playback timeline simultaneously indicating the different portions of the given content and a respective level of viewing interest for each of the different portions as indicated by the feedback;
wherein each of the different portions of content is assigned one of at least three different viewing desirability ranking values based on the feedback, the method further comprising:
receiving a time value indicating a desired duration of time in which to playback the given content, the time value less than an amount of time needed to playback the given content in its entirety; and
to provide playback of the given content in the desired duration of time as specified by the time value, selecting portions of the given content that are assigned a highest viewing desirability ranking value such that a playback time of the selected portions, when played back, fit within the time value.

\* \* \* \* \*

UNITED STATES PATENT AND TRADEMARK OFFICE
CERTIFICATE OF CORRECTION

| | |
|---|---|
| PATENT NO. | : 11,317,167 B2 |
| APPLICATION NO. | : 15/152967 |
| DATED | : April 26, 2022 |
| INVENTOR(S) | : Stephen L. Maynard et al. |

It is certified that error appears in the above-identified patent and that said Letters Patent is hereby corrected as shown below:

In the Claims

Column 22, Line 32, delete "payback", insert --playback--

Signed and Sealed this
Twenty-eighth Day of June, 2022

Katherine Kelly Vidal
*Director of the United States Patent and Trademark Office*